(12) United States Patent
Guan et al.

(10) Patent No.: US 8,494,059 B1
(45) Date of Patent: Jul. 23, 2013

(54) BUFFER CONTROLLER

(75) Inventors: Hongjie Guan, Fremont, CA (US);
Junqiang Lan, Santa Clara, CA (US);
Yaojun Luo, Pleasanton, CA (US);
Guan-Ming Su, Fremont, CA (US);
Ching-Han Tsai, San Jose, CA (US);
Chi-Kuang Chen, Santa Clara, CA (US); Li Sha, San Jose, CA (US)

(73) Assignee: Marvell International Ltd. (BM)

( * ) Notice: Subject to any disclaimer, the term of this patent is extended or adjusted under 35 U.S.C. 154(b) by 933 days.

(21) Appl. No.: 12/511,425

(22) Filed: Jul. 29, 2009

Related U.S. Application Data

(60) Provisional application No. 61/084,332, filed on Jul. 29, 2008, provisional application No. 61/084,518, filed on Jul. 29, 2008.

(51) Int. Cl.
*H04N 11/02* (2006.01)

(52) U.S. Cl.
USPC ........................................ 375/240.23; 348/51

(58) Field of Classification Search
USPC ........................................ 375/240.23, 240.25
See application file for complete search history.

(56) References Cited

U.S. PATENT DOCUMENTS

| | | | |
|---|---|---|---|
| 7,230,917 B1* | 6/2007 | Fedorkow et al. | 370/229 |
| 2002/0106018 A1* | 8/2002 | D'Luna et al. | 375/240.01 |
| 2005/0081089 A1* | 4/2005 | Hayardeny et al. | 714/6 |
| 2006/0232452 A1 | 10/2006 | Cha | |
| 2008/0072016 A1 | 3/2008 | Gong | |
| 2009/0080788 A1 | 3/2009 | Lynch et al. | |
| 2009/0103608 A1 | 4/2009 | Lin et al. | |
| 2009/0271536 A1* | 10/2009 | Tiennot | 710/28 |

* cited by examiner

*Primary Examiner* — Christopher S Kelley
*Assistant Examiner* — Christopher Findley

(57) ABSTRACT

Devices, systems, methods, and other embodiments associated with a buffer controller are described. In one embodiment, an apparatus includes a buffer to buffer data. The apparatus further includes a status register and control logic. The control logic at least processes write commands. When the buffer is full and a write command to write data to the buffer is received, the control logic is configured to: accept the data without writing the data to the buffer, send an acknowledgment that the buffer was written, and set an overflow bit in the status register.

17 Claims, 11 Drawing Sheets

BUFFER CONTROLLER

CROSS REFERENCE TO RELATED APPLICATIONS

This application claims the benefit of U.S. provisional application Ser. No. 61/084,518, filed on Jul. 29, 2008, and U.S. provisional application Ser. No. 61/084,332, filed on Jul. 29, 2008, which are both hereby incorporated by reference.

BACKGROUND

Video compression is used in a variety of products. Video compression is used in digital television set-top boxes, digital satellite systems, high definition television (HDTV) decoders, digital versatile disk (DVD) players, video conferencing, and other digital video applications. Video compression allows an image of video content to be compressed by removing non-essential features of the video content. Compressing video content reduces the storage area needed to store the content. Compressed video content may be transmitted faster than un-compressed video content because compressed video content contains less data than uncompressed video content.

Video compression/decompression algorithms perform several operations on an image of video content when compressing or decompressing the image. For example, one step during compression may include transforming the image from a spatial domain to a frequency domain using a discrete cosine transform. The transformed image is then quantized. The image can be encoded to reduce the amount of data needed to represent the image; however, encoding reduces the precision of the image. The image can be encoded using variable length decoding. Variable length decoding uses more bits to encode less commonly occurring symbols than are used to represent more commonly occurring symbols. Symbols are representations of bit values of the image. A decoder can recreate the image by performing steps similar to the encoding process in reverse. A better way of encoding and/or decoding images may be desired.

SUMMARY

An example embodiment includes an apparatus comprised of a buffer to buffer data. The apparatus further includes a status register and control logic. The control logic at least processes write commands. When the buffer is full and a write command to write data to the buffer is received, the control logic is configured to: accept the data without writing the data to the buffer, send an acknowledgment that the buffer was written, and set an overflow bit in the status register.

In one embodiment, when the buffer is empty and a read command to read the buffer is received from a requesting device, the control logic functions to: return dummy data to the requesting device and set an empty bit.

In one embodiment, the buffer functions to buffer decoded syntax element values of a compressed image. The buffer functions to receive the decoded syntax element values from a variable length decoder (VLD) engine.

An example embodiment includes an apparatus comprised of a variable length decoder (VLD) engine to decode variable length syntax elements of an image. The syntax elements are decoded based, at least in part, on decode commands to generate decoded syntax element values. The apparatus includes a command queue function to buffer the decode commands. The apparatus includes a syntax element value (SEV) queue to store the decoded syntax element values. The apparatus includes an overflow indicator, an empty indicator, and a control logic. The control logic functions to control the overflow indicator and the empty indicator based, at least in part, on a number of decode commands that are in the command queue and a number of decoded syntax element values that are in the syntax element value queue.

In one embodiment, the apparatus functions to receive the decode commands from a processor. The apparatus functions to prevent the processor from changing the overflow indicator and the empty indicator when the variable length decoder engine is decoding variable length syntax elements of a macro-block (MB) of data.

In one embodiment, the apparatus part of a system on a chip. Firmware running on the apparatus has access to control the overflow indicator and the empty indicator when the variable length decoder engine is not decoding variable length syntax elements of a macro-block (MB) of data.

One embodiment includes a method. The method receives a request to write data to a queue and determines if the queue is full. If the queue is not full, the data is written to the queue and a reply is sent that the queue has been written with the data. If the queue is full, the data is not written to the queue and a reply is sent that the queue has been written with the data, even though the data was not written.

In one embodiment, the method sets an overflow indicator when the request to write data to the queue is received and the queue is full.

In another embodiment, the method includes setting an overflow indicator to a value to indicate the queue overflowed when the request to write data to the queue is received and the queue is full. The method includes controlling the overflow indicator to maintain the value indicating the queue overflowed until a reset message is received from firmware. The setting the overflow indicator and the controlling the overflow indicator to maintain the value are performed with hardware. Additionally, the method resets the overflow indicator.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
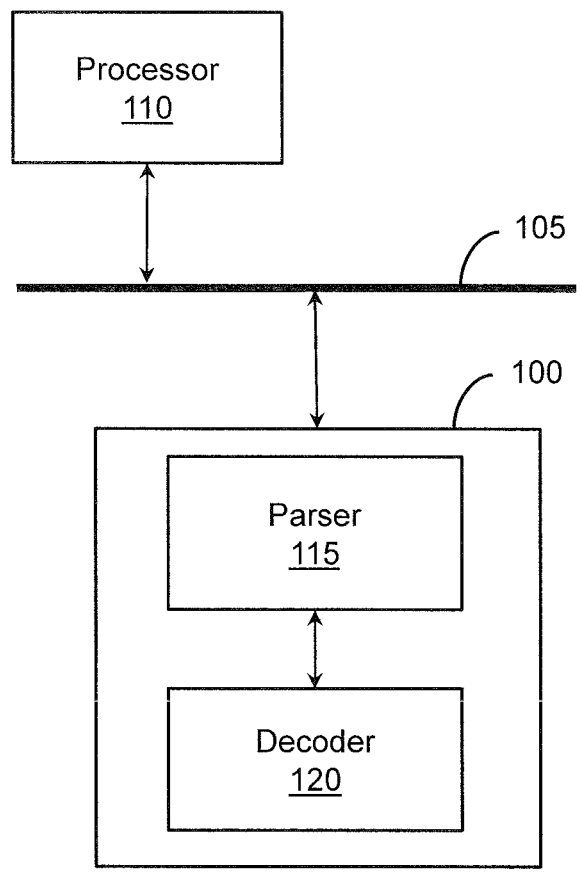
FIG. 1 illustrates an embodiment of an apparatus associated with decoding image data.

Described herein are example systems, methods, and other embodiments associated with decoding image data. Prior to discussing the present systems, consider the following example of how a compressed digital image may be decoded. A bitstream may be used to represent data values of a digital image. In one example, the data values are in a form of encoded syntax elements, which are processed to produce decoded syntax elements of the image. The decoded syntax elements can be further processed to recreate the image. Syntax elements may vary in size and are represented in the bitstream as variable length strings of bits. A syntax element may be represented as a string of back-to-back bits in the bitstream. For example, one syntax element may be represented by 12 back-to-back bits in the bitstream and the next syntax element in the bitstream may be formed from 20 back-to-back bits, and so on.

In one embodiment, an apparatus is configured to receive and execute a command to decode one or more syntax elements. The command is referred to as a "looping" command when the command instructs the apparatus to decode more than one syntax element (e.g. one instruction for multiple syntax elements). By not using a single instruction to decode each syntax element, the apparatus may reduce bus traffic on a bus used to issue the commands to the apparatus. In one embodiment, the apparatus may be connected to a common bus as part of a system on a chip.

In another embodiment, a looping command and an address are used to control the apparatus to decode compressed image data. For example, the looping command and address can be used to decode a first syntax element as well as back-to-back adjacent syntax elements that are next in the bitstream. The looping command specifies how many syntax elements to decode and the address is a table identification (ID) used to decode the first syntax elements. When the apparatus receives the looping command and the first table ID, the apparatus is controlled to look up a value of the first syntax element in a table pointed to by the first table ID. The apparatus determines the next table ID for looking up the next syntax element. The next table ID may be encoded as part of a value of the first syntax element. The apparatus looks up and retrieves a value of the next syntax element from a table pointed to by the next table ID. The apparatus can determine the next syntax element value as well as subsequent syntax element values in this manner until the command has been fully executed.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, instructions stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include at least one circuit, one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Automatic Looping and Table Selection—Variable Length Decoding Engine

FIG. 1 illustrates one embodiment of an apparatus 100 configured to process image data. The apparatus 100 receives the image data as a bit stream along with a command. In one embodiment, the command is a looping command that instructs the apparatus 100 to decode the bitstream and to determine two or more syntax elements of the image. In one embodiment, the syntax elements may be similar to symbol representations of data transferred over a communication link. In the following examples, the apparatus 100 will be described with a configuration that processes compressed image data. However it will be appreciated that the apparatus 100 may be implemented to process other types of data, uncompressed data, encoded data, non-image data, and/or combinations of data types, and so on. Thus, in other embodiments, the apparatus 100 is configured to process other kinds of data.

In one embodiment, the apparatus 100 may be part of a system on a chip and connected to a bus 105. A processor 110 may be connected to the bus 105. Other components may also be connected to the bus. For example, other processors, controllers, and/or memories. The processor 110 may be a nanomachine. When the apparatus 100 receives a bitstream of compressed image data, the image data may be stored into a video elementary stream (VES) queue. The apparatus 100 receives commands from the processor 110 and parses the commands with a parser 115. The parser 115 functions to identify components of each command. As discussed below, a decoder 120 determines syntax element values of the compressed image data based, at least in part, on the commands.

In one embodiment, the command includes instructions that specify how to decode a syntax element bitstream of a bitstream of compressed image data. As previously explained, syntax element bitstreams are back-to-back bitstreams forming the compressed image data. Different syntax element bitstreams in the bitstream may have different bit lengths. In one embodiment, the apparatus 100 determines the lengths of the different syntax element bitstreams. After parsing, the apparatus 100 determines if the command is a looping command, which is one that is repeated (e.g., looped). The decoder 120 is controlled to decode two or more syntax element bit streams when the command is repeated. A command that is repeated may also be referred to as a "loopAuto" command as well as a looping command.

The command may also specify how to determine a first table associated with the syntax element bitstream. In one embodiment, if the loopAuto command does not specify a first table, then the command is followed by a command specifying the table. The next command specifying the first table may be referred to as an "autoTable" command. The first table is the table identification (ID) of a table used to decode a first syntax element associated with the command.

The syntax element bitstream is decoded based, at least in part, on retrieving a value in the first table to generate a syntax element. Additional syntax element bitstreams are decoded when the command is repeated. In one embodiment, the decoder 120 decodes one or more commands subsequent to the command corresponding to the number of times to repeat the command. For example, if the command is repeated six times, then the decoder 120 decodes six syntax element bitstreams to produce six syntax elements.

In one embodiment, the parser 115 functions to identify multiple instructions with the command. For example, the command may include a first instruction that specifies the number of times to repeat the command, and a second instruction that specifies a starting table to look up a first value in the starting table. The first value from the table is used to generate a first syntax element corresponding to a syntax element bitstream. Subsequent syntax element bitstreams are associated with tables corresponding to prior adjacent syntax element values.

In one embodiment, a table is specified by the loopAuto command but no tables are specified for decoding subsequent encoded syntax element bitstreams. For subsequent syntax element bitstreams to be processed by the loopAuto command, a portion of the previously decoded syntax element specifies a table to be used to decode a current syntax element bitstream. The current syntax element is adjacent and back-to-back to the next syntax element. The decoder 120 decodes the current syntax element bitstream based, at least in part, on the table specified by a portion of the prior decoded syntax element value. In contrast to loopAuto and autoTable commands, a "regular" command causes one syntax element bitstream to be decoded and specifies the table.

Table 1 shows three example command listings that decode the same four syntax element bitstreams.

TABLE 1

Listing 1:

CMD(REG, Table 40);
POP;
CMD(REG, Table 5);
POP;
CMD(REG, Table 25);
POP;
CMD(REG, Table 30);
POP;

TABLE 1-continued

Listing 2:

CMD(LoopAuto, 4 loops);
autoTable(Table 40);
POP;
POP;
POP;
POP;

Listing 3:

CMD(LoopAuto, 4 loops, Table 40);
POP 4;

Listing 1 shows one example to decode four syntax elements using regular commands (CMD REG) that specify a table (e.g. Table 40). The POP commands are commands issued to return one syntax element from a syntax element value (SEV) queue for further processing. Listing 2 accomplishes the same decoding with two fewer instructions. In one embodiment, the LoopAuto and the autoTable instructions can be issued to apparatus 100 at the same time when the apparatus 100 is capable of accepting dual instructions. Listing 3 accomplishes the same decoding with two instructions; CMD and POP. Here the loopAuto instruction in listing 3 specifies repeating the decoding of syntax element values 4 times as well as the first table, table 40.

In some situations, the apparatus 100 may be receiving commands from a processor 110 that is speculatively issuing loopAuto commands. However, there may not be enough syntax bit streams for the loopAuto command to process. In one embodiment, the decoder 120 is configured to detect when a command cannot be completed and send an error message.

Sometimes the value of a previously decoded syntax element bitstream does not assign a table ID for a next syntax element value. In one embodiment, when a table is not assigned, the apparatus 100 stops repeating the command and the apparatus 100 does not send an error message.

In another embodiment, the apparatus 100 may include generation logic (not shown). The generation logic functions to generate a decoded bitstream based, at least in part on syntax elements decoded by the decoder 120. The decoded bit stream is a string of concatenated syntax elements that may be in the original order of the original encoded syntax element bitstreams. The generation logic transmits the decoded bitstream to a demodulator for further demodulation into an image.

In another embodiment, the decoded syntax element values may be stored in a syntax element value (SEV) queue where the syntax elements are later extracted for further processing. The SEV queue and the video elementary stream (VES) queue can be first-in-first-out (FIFO) queues.

With the configuration of the apparatus 100, bus traffic on the bus 105 may be reduced because the apparatus 100 is controlled by and executes looping commands to decode several syntax element values. This may provide fewer commands as compared to transmitting a separate command to decode each individual syntax element of the bitstream.

In one embodiment, the apparatus 100 may be part of an entropy decoder that decodes images that have been entropy encoded. Entropy reduces the amount of data needed to represent an image. Typically this is performed by dividing a source image into symbols (e.g., syntax elements) and processing the image symbol-by-symbol. A variable length code table is used to code a portion of an image into symbols. The variable-length code table may be derived in a particular way based on the estimated probability of occurrence for each possible value of the source symbol. The most common image data is encoded using shorter strings of bits than the strings of bits used to encode less common source symbols. Common symbols occur more often in an image than less-common symbols. The entropy encoding scheme may be a Huffman coding, an arithmetic coding, or another encoding scheme.

Figure 2:
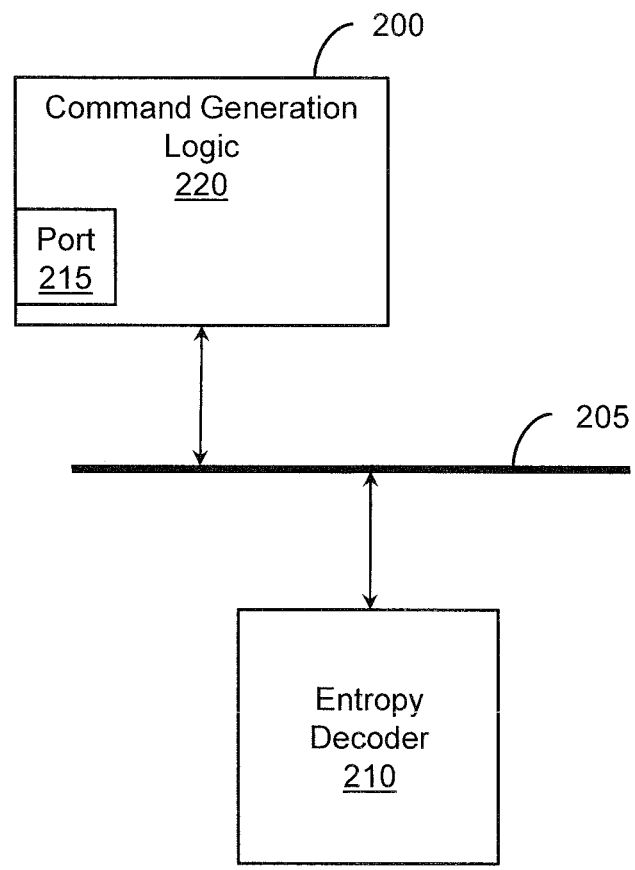
FIG. 2 illustrates another embodiment of an apparatus associated with decoding image data.

FIG. 2 illustrates one embodiment of an apparatus 200 that generates commands to decode syntax elements of an image bitstream. The apparatus 200 may be part of a system on a chip. The commands generated by the apparatus 200 are sent over a bus 205 to an entropy decoder 210. The apparatus 200 generates commands that may specify that two or more syntax elements are generated upon execution of a single command. The entropy decoder 210 executes the commands to generate syntax elements. The entropy decoder 210 then outputs the syntax elements so that other devices can access the decoded syntax elements and process the syntax elements into an image. In one embodiment, the decoded syntax elements are stored into a syntax element value (SEV) queue. The bus performance may be improved because fewer commands are used for decoding syntax elements (e.g. multiple syntax elements are decoded per one command).

The apparatus 200 is implemented with an input port 215. The input port 215 receives a stream of bits representing a compressed image. The compressed image is formed of back-to-back syntax element bitstreams. As discussed above, the syntax element bitstreams are variable length bit streams of bits. The syntax element bitstreams may be encoded data that is encoded with a Huffman encoding algorithm, an arithmetic encoding algorithm, or another algorithm.

The apparatus 200 includes command generation logic 220 that determines a first lookup table to be used to determine an initial syntax element associated with an initial syntax element bitstream. The command generation logic 220 generates one or more commands for decoding the initial syntax element bitstream and one or more additional syntax element bitstreams (e.g. bitstreams that are next in the sequence). Decoding the initial syntax element bitstream and the next syntax element bit streams create a looping decode of encoded syntax element bitstreams. When generating commands, the command generation logic 220 inserts a field specifying the first lookup table for the initial syntax element bitstream into the command. In one embodiment, the command generation logic 220 does not specify other lookup tables. In one embodiment, the command generation logic 220 generates a single command to create the looping decode of encoded syntax element bitstreams.

Subsequently when the one or more commands are decoded, the first syntax element bitstream is decoded using the lookup table specified in the command. In one embodiment, no other lookup tables are specified by the one or more commands for decoding the remaining syntax element bitstreams. Rather, the lookup tables used to decode the remaining syntax element bitstreams are determined from values in corresponding decoded syntax elements adjacent to a syntax element bitstream currently being decoded. The next syntax element bitstreams are decoded using the table identification (ID) specified by the prior syntax element bit stream in sequence until the number of syntax elements specified by the commands have been decoded.

The loopAuto command and the autoTable commands discussed above may be used by the command generation logic 220 to create a looping action when decoding syntax elements. In one embodiment, the command generation logic 220 generates two commands to decode the initial syntax element bitstream and one or more of the next syntax element bitstreams. The two commands may be the loopAuto command to specify how many loops and the autoTable command. The autoTable command specifies that the table ID of the table used to decode a next syntax element bitstream is dependent on the prior value of a decoded syntax element bitstream. The decoded syntax element bitstream is prior to and adjacent (e.g., back-to-back) to the next syntax element bitstream.

In another embodiment, the apparatus 200 provides a parsing function to determine a string of adjacent dependent syntax element bitstreams. The command generation logic 220 generates a single command to decode the string of adjacent dependent syntax element bitstreams. The single command includes an autoTable parameter. The autoTable parameter specifies the table for decoding the current syntax element bitstream based, at least in part, on a prior adjacent syntax element bitstream value.

In another embodiment, the command generation logic generates a dual_parse command that includes a first command and second command. The first command specifies how to decide a first syntax element bitstream and the second command specifies how to decide a second syntax element bitstream. In another embodiment, the dual_parse command may contain a backspace field. The backspace field allows results of the second command to be undone to allow a syntax element bitstream associated with the second command to be re-decoded. For example, a control logic that generated the dual_parse command may determine that the wrong lookup table was used by the second command. When this happens, a new dual_parse command is generated with a backspace value that undoes the second command. The second parse command is then re-issued. The re-issued second parse command should then correctly decode the second syntax element bitstream.

Figure 3:
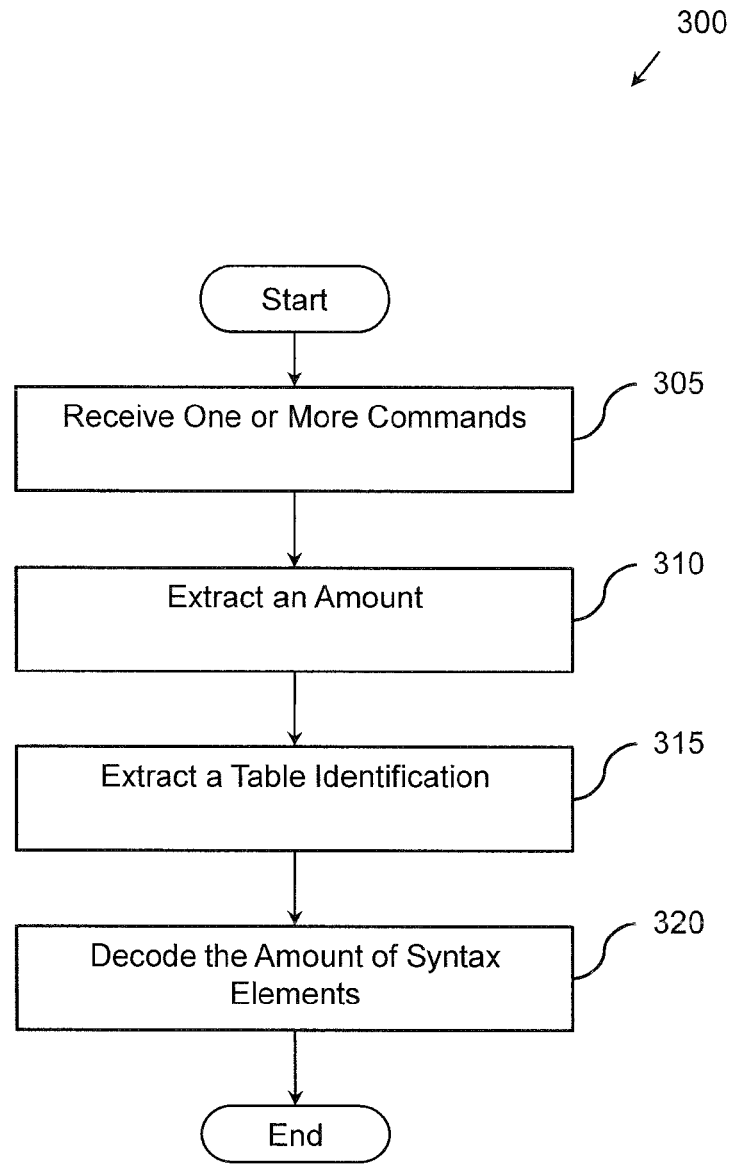
FIG. 3 illustrates one embodiment of a method associated with decoding image data.

FIG. 3 illustrates an embodiment of a method 300 associated with decoding syntax elements from a bitstream of compressed image data. The method 300 may improve the decoding of image data by reducing the number or instructions used. As previously explained, single instructions are generated that decode multiple syntax elements, which then control an apparatus to decode image data.

The method 300 receives, at 305, one or more commands to process a stream of bits of an encoded video image into syntax elements. In one example, the encoded video image may have the following structure: The syntax elements are encoded into syntax element bitstreams that vary in length from syntax element bitstream to syntax element bitstream. The syntax element bitstreams are concatenated in a back-to-back formation to form a stream of bits of an encoded video image. The syntax element may have been encoded with a Huffman encoding algorithm, an arithmetic encoding algorithm, or another algorithm.

An amount of syntax elements to decode is extracted, at 310, from the one or more commands. The amount of syntax elements to decode is greater than the number of commands received. The amount of syntax elements to decode may correspond to the number of times to loop a command. One syntax element bitstream is decoded in one loop. For example, two commands may be received, at 305. If the number of times to loop one command is 20, then 20 syntax element bitstreams will be decoded to produce 20 decoded syntax elements.

In one embodiment, a single table identification (ID) is extracted, at 315, from the one or more commands. The table ID is a starting point for looking up/retrieving a table value in a lookup table pointed to by the table ID. As discussed below, the table value is used to determine a first decoded syntax element. In another embodiment, the table value is the decoded syntax value.

At 320, the specified amount of syntax elements are decoded. The first syntax element is decoded, at 320, based, at least in part, on the table ID. For example, the table ID points to a first table. The encoded first syntax element is used to lookup and retrieve a table value in the first table. The table value that is retrieved is used to represent the decoded form of the encoded syntax element. For example, the retrieved table value represents at least a portion of the decoded syntax element.

Next, a second table ID is determined based, at least in part, on the first decoded syntax element value. For example, the second table ID is specified by a portion of the table value looked up in the first table. Once the second table ID is known, at least a portion of a second encoded syntax element bitstream is used to lookup a second table value in a second table. A decoded syntax element value is based, at least in part, on the second table value. The method 300 may continue to decode a third syntax element, a fourth syntax element, and so on until the designated amount of syntax elements is decoded.

In one embodiment, two commands may be received at block 305. For example, one command is a loopAuto command and the other command is an autoTable command. The method 300 extracts, at 310, a designated amount of syntax elements to decode from the loopAuto command. The method 300 extracts, at 315, the table ID from the autoTable command.

In another embodiment, the received commands may include a dual_parse command. An example dual_parse command includes two separate instructions that are executed in parallel. One instruction is "speculative" when its result cannot be determined to be correct until both dual_parse instructions have executed. For example, the two instructions may include one instruction to decode a first encoded syntax element and a second instruction to decode a second encoded syntax element. In an example situation, suppose that after decoding, the second decoded syntax element is determined to be incorrect. In this case, another dual_parse command may be generated with the same second instruction and a new instruction. The correct decoded second syntax element is now determined when the dual_parse instruction is executed. However, the result of the new instruction should be checked to determine if it is correct.

In another embodiment, the dual_parse command may include one loopAuto command and one autoTable command. As previously explained, the amount of syntax elements to decode is extracted from the loopAuto command. The table ID is extracted from the autoTable command. In one embodiment, the autoTable command retrieves a decoded syntax element from a lookup table based, at least in part, on a portion of a previously decoded syntax element value from an adjacent syntax element.

In another embodiment, the method 300 retrieves the encoded syntax element bitstreams from a variable element stream (VES) first-in-first-out (FIFO) queue. The method 300 may retrieve commands from a command (CMD) FIFO queue. After decoding, the method 300 may shift the decoded syntax elements into a syntax element value (SEV) FIFO queue.

It will be appreciated that in one embodiment, the methods herein may be implemented as computer executable instructions embodied and stored on a computer-readable medium. When executed by a machine (e.g., processor, device), the instructions cause the machine to perform the methods herein or their equivalents. The methods may be implemented in a semiconductor chip. The methods can also be implemented with circuits.

Speculative Dual-command Variable Length Decoding Engine with Backtracking

Figure 4:
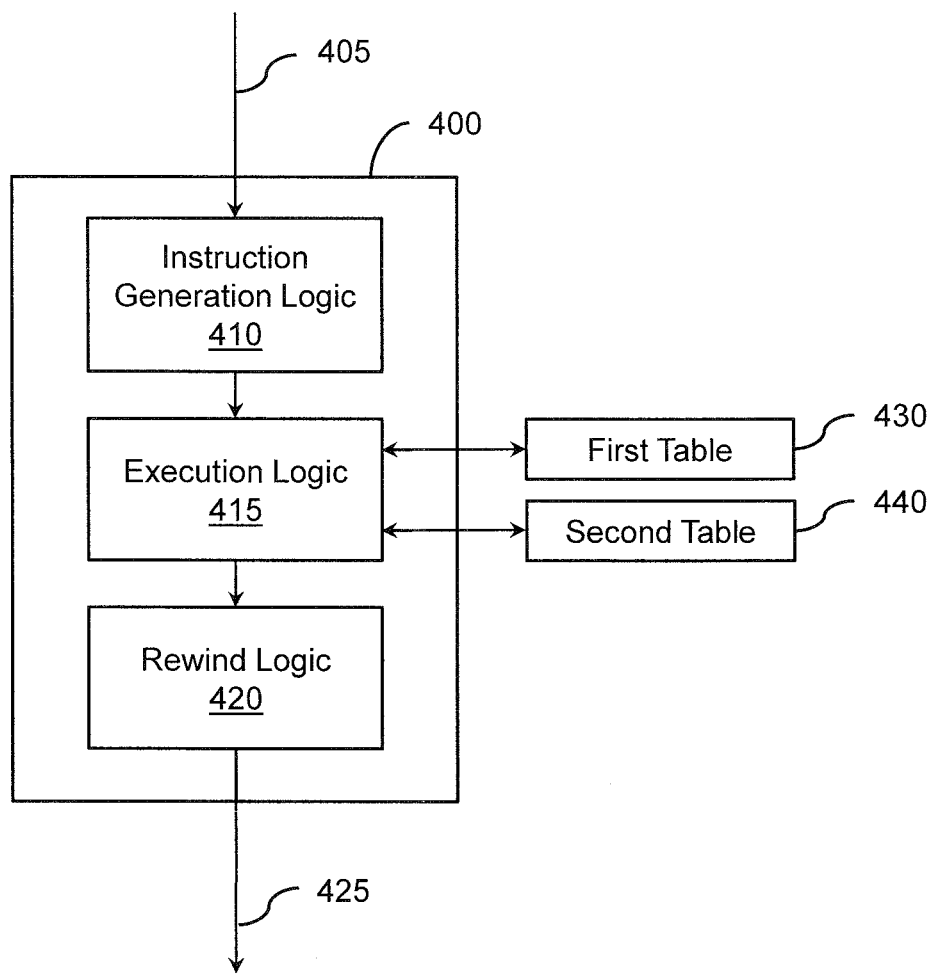
FIG. 4 illustrates another embodiment of an apparatus associated with decoding image data.

FIG. 4 illustrates one embodiment of an apparatus 400 that functions to decode syntax elements of an image bitstream. In one embodiment, the image bitstream, which is in an encoded form, may be received from a bitstream input channel 405. The apparatus 400 may be part of a system on a chip. The apparatus 400 generates decoding instructions, where each instruction includes two commands to decode two variable length syntax elements of the encoded image. Generating a single instruction that contains two decoding commands reduces memory traffic and allows buses and memory systems more time to process other tasks.

In one embodiment, the two commands are generated by instruction generation logic 410 and are sent to execution logic 415. The execution logic 415 executes the two commands in parallel to generate two decoded syntax elements. The execution logic 415 then outputs the two decoded syntax elements to rewind logic 420. The rewind logic 420 checks to be sure both of the decoded syntax elements are correct. In general, a first syntax element will be correct and will be output to an output line 425 for further processing. The rewind logic 420 notifies the instruction generation logic 410 when one of the decoded syntax elements is incorrect. The instruction generation logic 410 functions to generate a new command to decode the incorrectly decoded syntax element a second time in parallel to a new syntax element. When the execution logic 415 executes the new command, the decoded syntax element value will be correct the second time and the new decoded syntax element should be checked by the rewind logic 420 to determine if it is correct.

In one embodiment, the instruction generation logic 410 may be in a processor that generates commands to be executed in parallel and sends the commands to the execution logic 415 over a bus. The execution logic 415 will send the results of the executed instructions over another bus to the rewind logic 420 when the rewind logic 420 is remote to the execution logic 415. In one embodiment, the rewind logic 420 may also be in a processor that generates the commands.

In one embodiment, the execution logic 415 is configured within a video decompression engine to execute a decompression instruction that decompress a bitstream. The execution logic 415 processes the decompression instruction by at least partially decompressing a portion of the bitstream and by at least partially decompressing a next portion of the bitstream. The execution logic 415 decompresses the two portions of the bitstream in parallel by looking up/retrieving values associated with the two portions in a first table 430 and a second table 440 in parallel.

In one embodiment when a bitstream is incorrectly parsed and/or decoded, the rewind logic 420 is configured to remove the effects of the decompression of the next portion of the bitstream. In one embodiment, the rewind logic 420 is configured to reset a pointer to a beginning position of the next portion of the bitstream. The apparatus 400 also discards decompression values associated with the incorrectly parsed bitstream.

In one embodiment, the instruction generation logic 410 begins decompressing the image data by generating an initial dual_parse instruction. The initial dual_parse instruction specifies an instruction to parse an initial portion of a bitstream of video data and to parse a next portion of the bitstream. The initial portion and the next portion of the bitstream may be consecutive portions that represent a serial portion of the bitstream. The initial portion and the next portion can be the same number of bits or a different number of bits.

Figure 5:
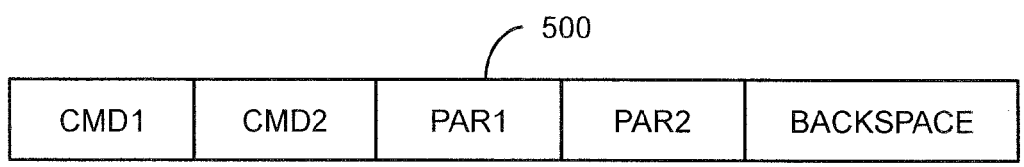
FIG. 5 illustrates an embodiment of an instruction associated with decoding image data.

In one embodiment, the instruction generation logic 410 generates the dual_parse instruction so that the dual_parse instruction contains a number of fields. FIG. 5 depicts a representation of the dual_parse instruction 500 with possible locations of example fields: "CMD1", "CMD2", "PAR1", "PAR2", and "backspace" within a dual_parse command generated by the instruction generation logic 410 of FIG. 4. The fields "CMD1" and "CMD2" represent commands to, at least partially, decompress the initial portion and the next portion of the bitstream, respectively. Fields "PAR1" and "PAR2" are parameter fields that provide further details about how to decode the syntax elements of the initial portion and the next portion, respectively. For example, "PAR1" and "PAR2" may specify how many bits to decompress and/or what type of a table lookup is to be performed. Table lookups are discussed below.

If the initial portion of the bitstream is correctly decompressed and the next portion is incorrectly decompressed, the "backspace" parameter indicates how to undo the incorrect syntax element. Consider the following example. The next portion of the bitstream can be incorrectly decompressed because the dual_parse instruction 500 speculatively indicates what table to use when decompressing the next portion. For example, a lookup table for the first command (CMD1) is known when the dual_parse instruction 500 is generated. However, a speculative lookup table for the second command (CMD2) is not known with certainty when the dual_parse instruction 500 is generated. The speculative lookup table is not known because it may be based on a history of recently used lookup tables. However, once the first command is executed, a result of the first command will specify an actual lookup table for executing the second command. When the speculative lookup table and the actual lookup table are different, the "backspace" parameter causes the second command to be re-executed with the actual lookup table.

Returning to FIG. 4, the execution logic 415 executes the initial dual_parse instruction to, at least partially, decompress a first portion of the bitstream and a second portion of the bitstream. The execution logic 415 may be configured to decompress the bitstream in one or more of a variety of ways.

In one embodiment, the execution logic 415 decompresses the first portion of the bitstream by retrieving a first value associated with the first portion of the bitstream in a first table 430. The execution logic 415 decompresses the second portion of the bitstream by retrieving a second value associated with the second portion of the bitstream in a second table 440. The rewind logic 420 determines if the second value is correct. A pointer may be retracted to a bitstream position by an amount of the "backspace" parameter when the second value is incorrect. The retraction undoes the effects of the dual_parse instruction had on the second portion of the bitstream. The instruction generation logic 410 may reissue a dual_parse instruction to decompress the next portion of the bitstream and the next portion after that. The next portion of the bitstream will be correctly decompressed, however, the portion after that one should be checked to be sure it decompressed correctly. The apparatus 400 will continue to process dual_parse instructions in this manner.

In one embodiment, the first and second portions of the bitstream may be stored in a buffer while the dual_parse instruction is being executed by apparatus 400. The first portion may be removed after execution of the dual parse instruction because the first portion of the bitstream will have been correctly decompressed. The second portion of the bitstream will remain in the buffer until the syntax element of the second portion is checked to determine if it is correct. In one embodiment, software checks the values of the decompressed second bitstream to determine whether the syntax element of the second portion is correct. The second portion is determined to be correct when software determines that a correct lookup table was used to look up the second portion. A correct table ID for decoding the second portion is embedded in the decoded first portion. When this table ID matches the lookup table ID used to decode the second portion of the bitstream, the apparatus determines that the correct table ID was used and the second portion is left in the buffer. If the table ID was incorrect, the second portion of the bitstream is removed from the buffer and a new second portion is determined with the correct table ID.

Variable Length Decoding Engine with Non-Blocking I/O FIFO for Error-Resilience

Figure 6A:
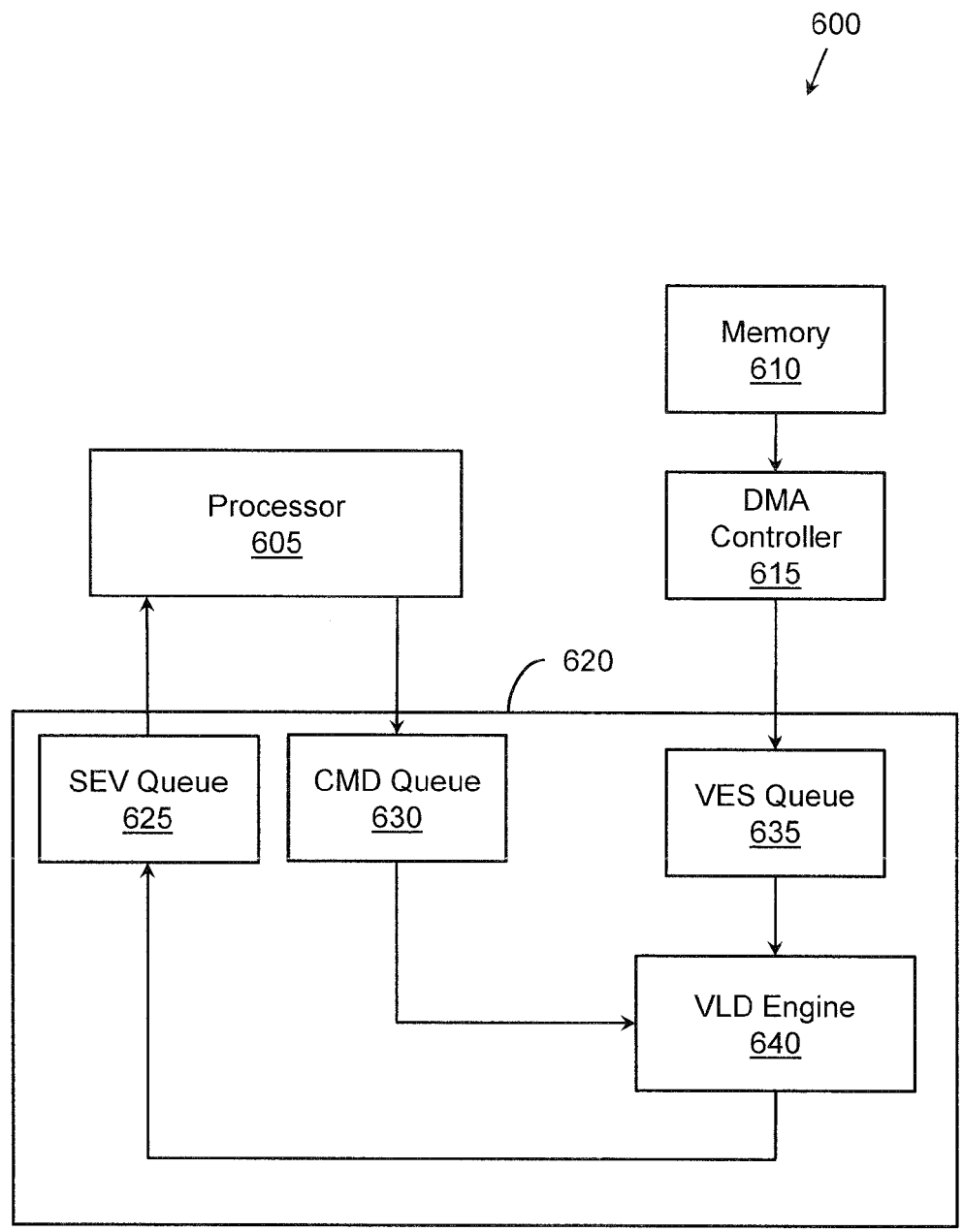
FIG. 6A illustrates an embodiment of a system associated with decoding image data.

FIG. 6A illustrates an embodiment of a system 600 associated with variable length decoding of a bitstream of encoded syntax elements. The apparatus 600 is implemented with non-blocking input/output (I/O) first-in-first-out (FIFO) queues. The non-blocking queues are used to receive commands to decode syntax element bitstreams and to output decoded syntax elements. A full non-blocking write queue accepts data when the data is written to the write queue; however the accepted data will be dropped and not written into the write queue when the write queue is full. An empty non-blocking read queue functions to return dummy read data. Non-blocking queues prevent hardware from entering an illegal state, entering a deadlock condition, or causing other errors.

As discussed below, status registers may be set to indicate that there was an attempt to write a full queue or read an empty queue. Software checks for errors and deadlock conditions at image macro-block (MB) boundaries so errors are not detected between boundaries. Using non-block queues may allow a decoding engine to determine more syntax elements of a whole macro-block than a system that uses queues, which can become blocked.

In one embodiment, the system 600 may be a part of a system on a chip. The system 600 is implemented with a processor 605, memory 610, direct memory access (DMA) controller 615, and decoder logic 620. The processor 605 may be connected to the multiplexer via a bus and other processors, memories, and devices may be connected to the bus. The processor 605 may be configured to execute software that generates instructions to decode a compressed image bitstream. The instructions are sent to the decoder logic 620 for execution. The compressed image bitstream is stored in the memory 610 and accessed by the DMA controller 615 and provided to the decoder logic 620. In one embodiment, firmware running elsewhere in the system 600 can monitor status bits in the decoder logic 620 to determine if there was an attempted write of a full queue and an attempted read of an empty queue.

The decoder logic 620 is implemented with a syntax element value (SEV) queue 625, a command (CMD) queue 630, a video elementary stream (VES) queue 635, and a variable length decoder (VLD) engine 640. The SEV queue 625, CMD queue 630, and VES queue 635 may be first-in-first-out (FIFO) queues. Commands to decode the bitstream of a compressed image are received by the command queue 630 and executed by the VLD engine 640. Compressed syntax element bitstreams of the compressed image data are provided to the VES queue 635 by the DMA controller 615. The VLD engine 640 accesses the VES queue 635 as needed when decoding syntax element bitstreams. Decoded syntax elements are provided to the SEV queue 635 by the VLD engine 640.

When there is an error in the encoded image bitstream, either the decoder logic 620 or software running in the processor 605 may enter an illegal state. When an illegal state is entered, the CMD queue 630 may overflow or the SEV queue 625 may underflow. An overflow or underflow may create a deadlock condition. To prevent a deadlock, a write of the CMD queue 630 and a read of the SEV queue 625 are both made to be non-blocking. These queues are made non-blocking with the use of status bits as discussed in the following example.

In an example operation, if the processor 605 (or other software) attempts to write a new command when the command queue 630 is full, the processor 605 is not stalled. Rather, the decoder logic 620 still returns a write acknowledgment to the processor 605, but a "status.overflow" register bit (e.g., overflow status bit) is set to indicate that an exception has occurred. If the processor 605 (or other software) attempts to read from an empty SEV queue 625 while the VLD engine 640 is idle, the decoder logic 620 returns a dummy zero-valued data in order not to block the execution of the processor 605. Also, a "status.underflow" register bit (e.g., underflow status bit) is set to indicate that an exception has occurred.

In one embodiment, firmware running on the processor 605 can request the status of the decoder logic 620. When the decoder logic 620 receives a status request, the decoder logic 620 checks whether the CMD queue 630 is empty, the SEV queue 625 is empty, and if a state machine in the decoder logic 620 is idle. An error status is returned when CMD queue 630 is not empty, the SEV queue 625 is not empty, or the state machine is not idle. Once firmware receives a non-zero status from the VLD engine 640, firmware may clear the corresponding overflow or underflow status bits. Clearing an overflow or underflow status bit will trigger a reset operation at the decoder logic 620 to clear the CMD queue 630, clear the SEV queue 625, and reset the state machine. This re-synchronizes the firmware and VLD engine 640 after an error occurs in the bitstream.

Figure 6B:
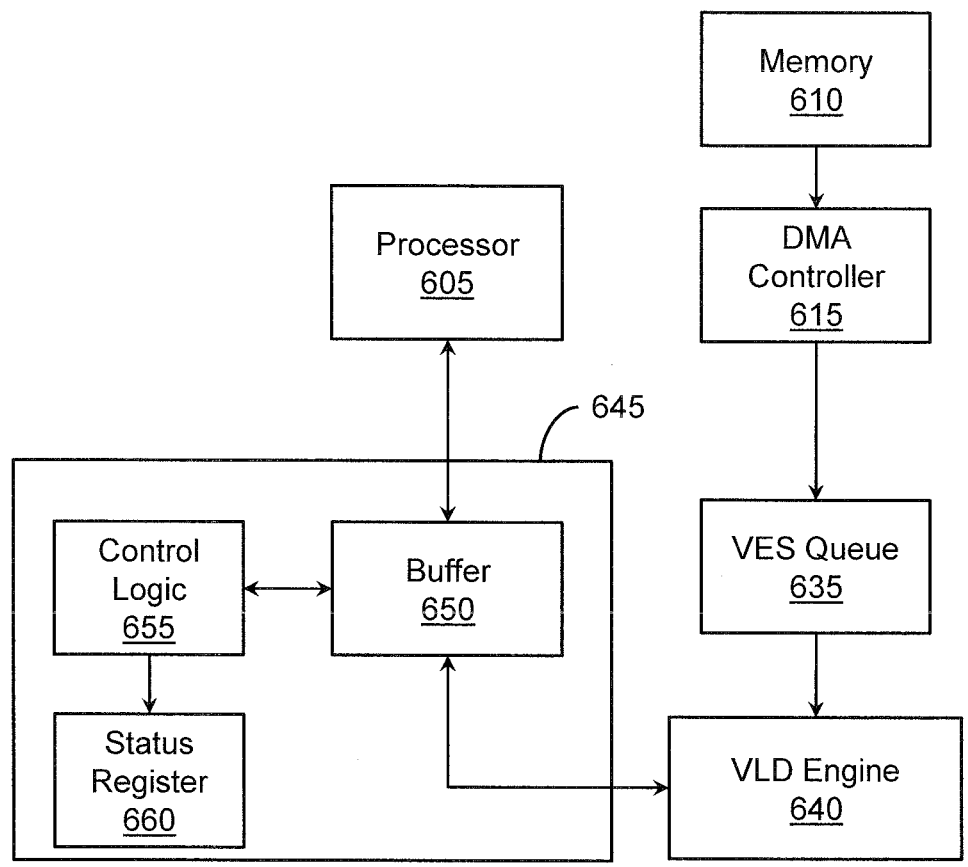
FIG. 6B illustrates another embodiment of a system associated with decoding image data.

FIG. 6B illustrates another embodiment of the system 600 of FIG. 6A and includes an apparatus 645 that buffers data in a buffer 650. The apparatus 645 is implemented between the processor 605 and the VLD engine 640 of FIG. 6A. The buffer 650 may be a read/write buffer and may contain data the VLD engine 640 is processing.

The apparatus 645 further includes control logic 655 to control the setting of a status register 660. The status register 660 may contain an overflow indicator bit and/or an underflow indicator bit corresponding to an overflow or underflow condition of the buffer 650, respectively. Other components of FIG. 6B are similar to corresponding components of FIG. 6A.

When the buffer 650 is full and a write command to write data to the buffer 650 is received, the control logic 655 functions to take the following actions. The control logic 655 accepts the data but does not write the data to the buffer 650. The control logic 655 sends an acknowledgment to a device that sent the write data to the buffer 650 indicating that the buffer 650 was written. The control logic 655 sends the message indicating the data was accepted even though the data was not written into the buffer 650 so that the apparatus 645 and/or processor 605 do not stall. The control logic 655 sets a bit in the status register 660 indicating the buffer 650 has overflowed. The processor 605 or other applications can check the status register 660 to determine when the buffer 650 is overflowed. The apparatus 645 will perform similar operations when the buffer 650 is empty and the processor 605 attempts to read the buffer 650.

Figure 7:
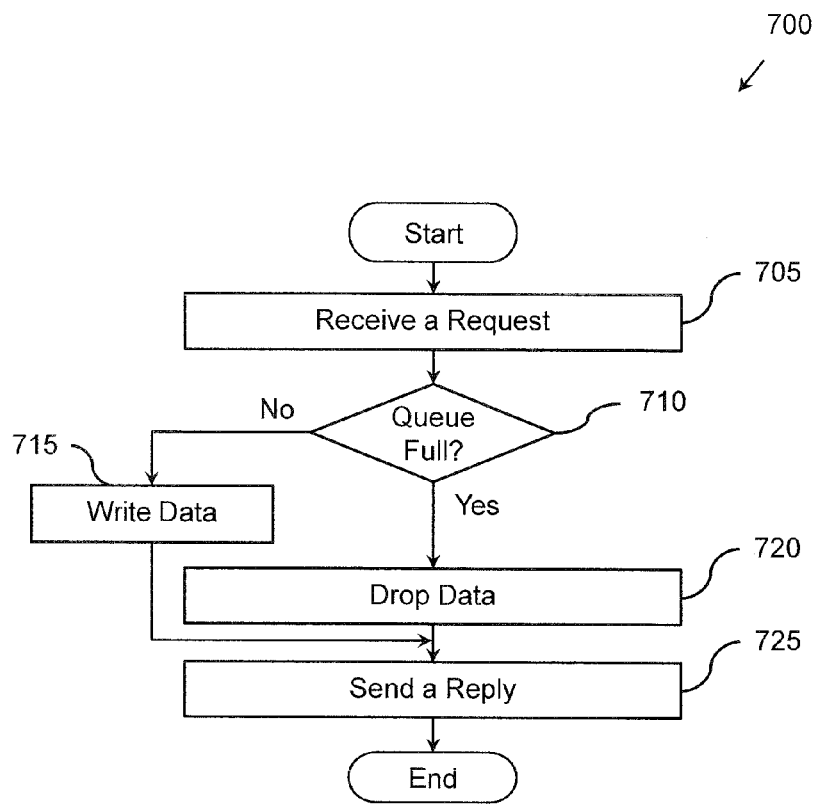
FIG. 7 illustrates another embodiment of a method associated with decoding image data.

FIG. 7 illustrates an embodiment of a method 700 associated with decoding variable length encoded syntax elements of a compressed image. First-in-first-out (FIFO) queues are used to store data used to decode the encoded syntax elements. At times, a queue may become full or empty, which may stall a device that is trying to access the full or empty queue. To reduce or eliminate device stalls when a device is trying to write to a full buffer, a non-blocking write buffer is provided that functions to accept the data. However, the accepted data is then dropped and not written into the write buffer. When a device attempts to read from an empty queue, a non-blocking read buffer is provided that functions to return dummy read data. The non-blocking queues do not stall the devices because the devices believe that their requested reads/writes have been handled properly.

For example, the method 700 receives, at 705, a request from a requesting device to write data to a queue. The queue may be a FIFO queue that stores data, which may be processed by command messages. In one example, a command message may instruct a variable length decoder (VLD) how to decompress a macro-block (MB) of compressed image data.

A determination, at 710, is made to determine if the queue is full. The data is written, at 715, to the queue if the queue is not full. If the queue is full, then the data is dropped, at 720, and the data is not written to the queue. To avoid stalling the requesting device, a reply message is sent back to the requesting device to indicate that the queue has been written with the data even though the data was not written (block 725). Thus the requesting device believes the write was successful since it received an acknowledgement reply. As such, the requesting device can continue operating and a stall is avoided.

Figure 8:
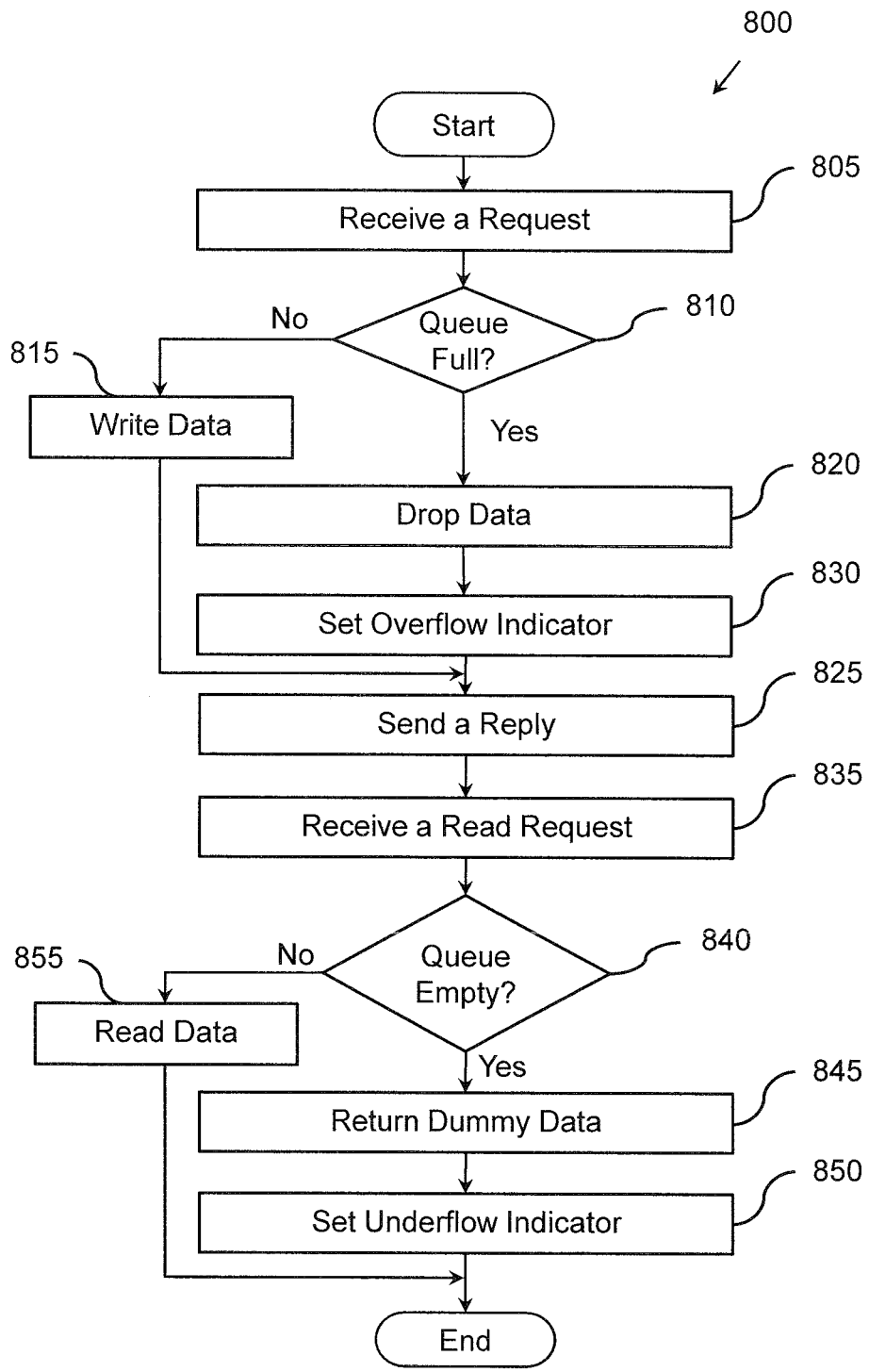
FIG. 8 illustrates another embodiment of a method associated with decoding image data.

FIG. 8 illustrates a method 800 that is another embodiment of method 700 from FIG. 7. The method 800 may be implemented at least partially in hardware, state machines, and/or combinational logic. The method 800 may be implemented as part of a system on a chip (SoC) that decodes macro-blocks (MBs) of encoded image data.

In FIG. 8, blocks 805-825 are similar to blocks 705-725 of FIG. 7. Method 800 includes an additional action of setting an overflow indicator, at 830, after data is dropped at 820 due to a full queue. In one embodiment, the overflow indicator may be a status bit of a status register that represents an overflow state or non-overflow state. The overflow indicator is controlled to maintain the overflow state indicating the queue is full until a reset message is received (e.g. received from firmware). In one example, the reset message is received when the VLD engine has completed processing of the current macro-block (MB) of compressed image data. The overflow indicator is reset in between the processing of MBs of image data. In one embodiment, setting the overflow indicator and controlling the overflow indicator to maintain its value are performed with hardware.

At a subsequent time, a request to read a queue may be received, at 835, from a requesting device. The queue may be a syntax element value (SEV) queue that stores decoded syntax element values of a compressed image. The syntax element values may have been decoded by the variable length decoder (VLD). The VLD may be decoding a macro-block of encoded syntax element values. The decoding is based, at least in part on data in the queue.

At 840, the method determines if the queue is empty. If the queue is empty, the read request is not processed but rather dummy data is returned, at 845, to the requesting device. The dummy data may be a zero value of data bits, in one example, or other type of data to be used in place of actual data from the queue. The requesting device thus receives a result and can continue. The method avoids stalling the requesting device, which is trying to read from an empty queue. An underflow indicator is then set, at 850, to indicate the queue is empty. In one embodiment, the underflow indicator may be a status bit of a status register. If the queue is not empty at 840, data is read from the queue and returned to the requesting device (block 855).

Figure 9:
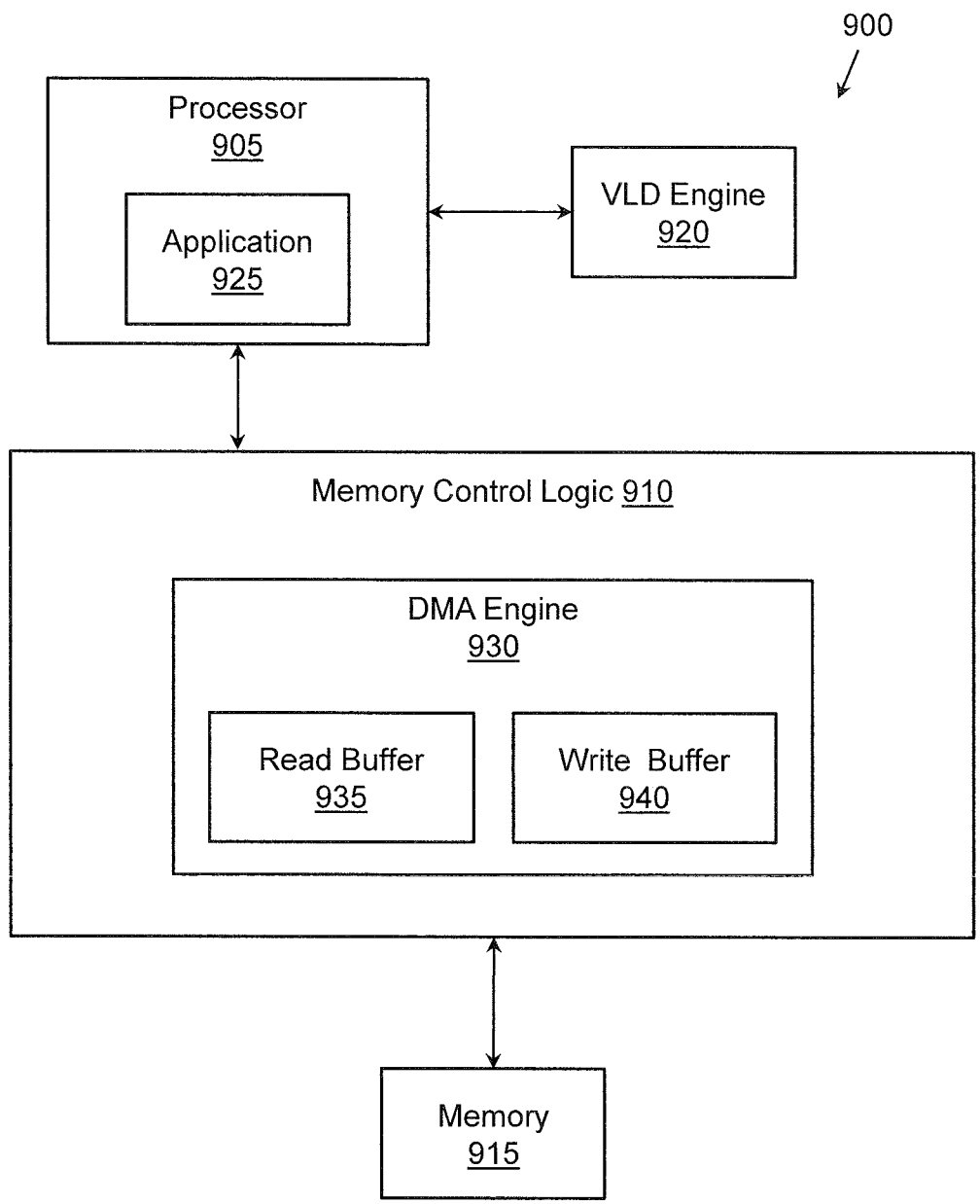
FIG. 9 illustrates another embodiment of an apparatus associated with decoding image data.

Fast Access of Memory by a Processor Via Hardware Assisted Write and Read Pre-fetching Channels FIG. 9 illustrates an embodiment of a system 900 associated with fast access of memory. The system 900 is implemented with a processor 905, memory control logic 910, a memory 915, and a variable length decode (VLD) engine 920. The memory control logic 910 functions to accept memory requests from the processor 905. The memory requests may have originated from an application 925 running on the processor 905.

In one embodiment, the processor 905 and the memory control logic 910 are connected to an advance high-performance bus (AHB). The processor 905 functions to access the memory control logic 910 over the AHB bus. The memory 915 may be connected to the memory control logic 910 with a double data rate (DDR) bus. In other embodiments, the system 900 may use other types of buses and/or combinations of the AHB bus, the DDR bus, and/or other types of communication channels.

In one embodiment, the memory control logic 910 is configured to act as an intermediary between the processor 905 and the memory 915. The memory control logic 910 buffers memory requests to and from the memory 915. For example, dynamic random access memories (DRAM) are more efficiently accessed in blocks of data. Thus data associated with a memory write request is buffered by the memory control logic 910 until a block of data is accumulated. This allows the block to be stored to the memory 915 with one memory transfer. If a memory request spans a memory block in the DRAM, the memory access time is increased. For a read request, the memory control logic 910 reads an entire block of data and stores the data as pre-fetched data. Later, the pre-fetched data can be returned to the processor 905 from the memory control logic 910 if the same data is requested. Buffering write data and pre-fetching read data can improve bus throughput and improve coherency of memory systems. Configuring the memory control logic 910 between the memory 915 and the processor 905 can improve the speed of decoding compressed image data in the VLD engine 920.

In one embodiment, the processor 905 (or executing application 925) issues a request to read data from the memory 915. The read request includes writing an address to be read to a read address register in the memory control logic 910. Once the read address register is written with the address, a DMA engine 930 starts pre-fetching data from the memory 915. The pre-fetched data is stored into a read buffer 935. The data may be pre-fetched in blocks (e.g. 128 bytes at a time) in response to a command from the memory control logic 910 issued to the memory 915. The data fetched is stored in the read buffer 935. When 128 bytes of space is available in the read buffer 935, another 128 bytes of data is pre-fetched. Of course, other sizes of blocks may be used.

In one embodiment, the processor 905 reads data from the read buffer 935 through a read data register. The read data register contains the data corresponding to the address that is stored in the read address register. After the processor 905 reads the data from the read data register, the read data register is then stored with data pointed to by the next address. The process continues for the next address and corresponding data until a new address is written to the read address register.

In one embodiment, the memory control logic 910 may be implemented with different sizes of read data registers corresponding to the size of data to be read. For example, the memory control logic 910 may contain an 8-bit register, a 16-bit register, a 32-bit register, and so on.

In one embodiment for writing data to the memory 915, the software 925 functions to write a starting address in a write address register in the memory control logic 910. The software 925 can then begin to write data by writing the first byte of data to a write data register in the memory control logic 910. The memory control logic 910 indicates to the software 925 that the data has been written. The indication is given even though the memory control logic 910 has not actually written the data to the memory 915. The DMA engine 930 functions to collect the data to be written in a write buffer 940. The data is collected until a good burst size of data has been collected and then the data is written to the memory 915.

For example, if the memory is a double data rate (DDR) memory, a certain fixed block size bytes (e.g., burst size) of data is collected before the data is written to the memory 915. Additionally, if a new address is written to the write address register, the collected data will be written to the memory 915 even if the collected data is not a complete burst size of data. In another embodiment, a flush register may be used in the memory control logic. A flush register is a register used to assure memory coherency. If data is written to the flush register, then the current amount of collected data may be written to the memory 915 even if the collected data is not a full burst size of data.

In one embodiment, the read buffer 935, the read address register, and the read data register correspond to one read channel. The write buffer 940, the write address register, and the write data register correspond to one write channel. In other embodiments, the memory control logic 910 can support more than one read and write channel by duplicating the appropriate sets of buffers and registers for the number of read and write channels desired.

In other embodiments of the system 900, the processor 905 and software 920 function to access the memory 915 using virtual addresses. In this manner, the virtual addresses do not need to be converted to physical addresses. In another embodiment, the system 900 is configured so that the software 925 accesses the memory 915 through the memory control logic 910 and does not access the memory 915 directly.

It will be appreciated that in one or more embodiments, the systems and/or methods herein or their equivalents may be implemented as computer executable instructions embodied and stored on a computer-readable medium. When executed by a machine (e.g., processor, device, etc), the instructions cause the machine to perform the methods herein and their equivalents. The methods may be implemented in a semiconductor memory chip. The methods may also be implemented with circuits, and/or hardware logic.

Figure 10:
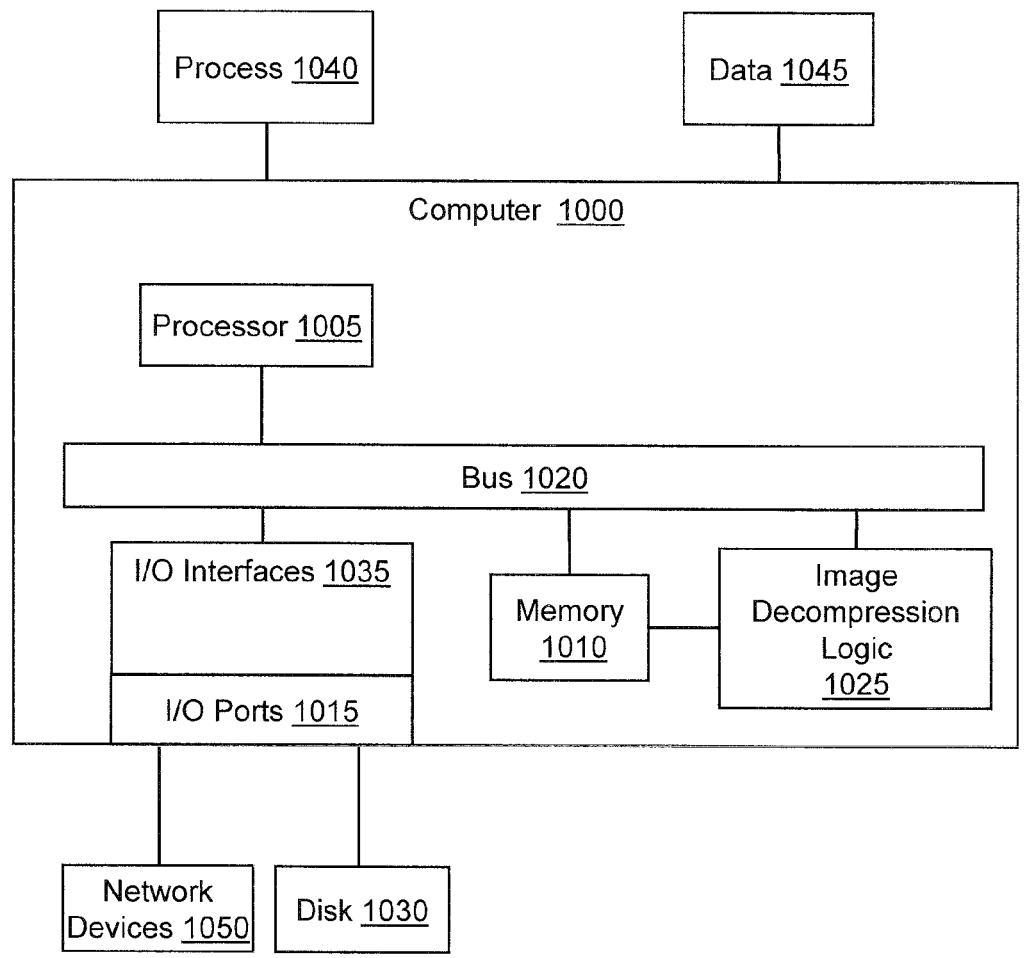
FIG. 10 illustrates an embodiment of a computing environment in which example systems and methods, and equivalents associated with decoding image data may operate.

FIG. 10 illustrates an example computer 1000 in which example systems and methods described herein, and equivalents, may be implemented. The example computer 1000 comprises a processor 1005, a memory 1010, and input/output ports 1015 operably connected by a bus 1020. In one example, the computer 1000 is implemented with image decompression logic 1025.

The image decompression logic 1025 provides means (e.g., hardware, stored instructions, and/or firmware) to decompress compressed image data. The image decompression logic 1025 can be implemented similar to apparatuses/ systems 100, 200, 400, 600, 645 and/or 900 of FIGS. 1, 2, 4, 6A, 6B and 9, respectively. Combination of the features may also be implemented. The image decompression logic 1025 can include logic implemented, for example, as an ASIC or other type of circuit.

Generally describing an example configuration of the computer 1000, the processor 1005 may be a variety of processors including a single processor, a dual microprocessor, and/or other multi-processor architectures. A memory 1010 may include volatile memory and/or non-volatile memory. Non-volatile memory may include, for example, read-only memory (ROM), programmable read only memory (PROM), erasable programmable read only memory (EPROM), phase change memory (PCM), electronically erasable programmable read only memory (EEPROM), and so on. Volatile memory may include, for example, random access memory (RAM), static random access memory (SRAM), dynamic random access memory (DRAM), and so on.

A disk 1030 may be operably connected to the computer 1000 via, for example, through an input/output interface (e.g., card, device) 1035 and the input/output port 1015. The disk 1030 may be, for example, a magnetic disk drive, a solid state disk drive, a floppy disk drive, a tape drive, a Zip drive, a flash memory card, a memory stick, and so on. Furthermore, the disk 1030 may be a compact disk read-only memory (CD-ROM) drive, a compact disk recordable (CD-R) drive, a compact disk rewritable (CD-RW) drive, a digital video disk read-only memory (DVD ROM), and so on. The memory 1010 can store a process 1040 and/or a data 1045, for example. The disk 1030 and/or the memory 1010 can store an operating system that controls and allocates resources of the computer 1000.

The bus 1020 may be a single internal bus interconnect architecture and/or other bus or mesh architectures. While a single bus is illustrated, it is appreciated that the computer 1000 may communicate with various devices, logics, and peripherals using other busses (e.g., peripheral component interconnect express (PCIE), 1394, universal serial bus (USB), Ethernet). The bus 1020 can be types including, for example, a memory bus, a memory controller, a peripheral bus, an external bus, a crossbar switch, and/or a local bus.

The computer 1000 may interact with input/output devices via the input/output (I/O) interfaces 1035 including the image decompression logic 1025 and the input/output ports 1015. Input/output devices may be, for example, a keyboard, a microphone, a pointing and selection device, cameras, video cards, displays, the disk 1030, the network devices 1050, and so on. The input/output ports 1015 may include, for example, serial ports, parallel ports, and USB ports.

The computer 1000 can operate in a network environment and thus may be connected to the network devices 1050 via the I/O interfaces 1035, and/or the I/O ports 1015. Through the network devices 1050, the computer 1000 may interact with a network. Through the network, the computer 1000 may be logically connected to remote computers. Networks with which the computer 1000 may interact include, but are not limited to, a local area network (LAN), a wide local area network (WLAN), a wide area network (WAN), and other networks.

While example systems, methods, and so on have been illustrated by describing examples, and while the examples have been described in detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
a buffer to buffer data;
a status register; and
control logic to at least process write commands and to:
when the buffer is full and a write command to write data to the buffer is received:
accept the data without writing the data to the buffer;
send an acknowledgment that the buffer was written;
set an overflow bit in the status register; and
where when the buffer is empty and a read command to read the buffer is received from a requesting device, the control logic functions to: return dummy data to the requesting device and set an empty bit.

2. The apparatus of claim 1, where the buffer functions to buffer decoded syntax element values of a compressed image, and where the buffer functions to receive the decoded syntax element values from a variable length decode (VLD) engine.

3. The apparatus of claim 2, where the buffer requests are software commands received from a processor, and where the apparatus, the VLD engine, and the processor are part of a system on a chip.

4. The apparatus of claim 1, where the apparatus is part of a system on a chip that includes firmware, where the firmware enables the apparatus to read and reset the overflow bit.

5. The apparatus of claim 1, where when the overflow bit is set by the apparatus, the apparatus functions to not reset the overflow bit until an external indication is received by the apparatus.

6. The apparatus of claim 1, where the buffer is a first-in-first-out (FIFO) buffer.

7. An apparatus comprising:
a variable length decoder (VLD) engine to decode variable length syntax elements of an image based, at least in part, on decode commands to generate decoded syntax element values;
a command queue to buffer the decode commands;
a syntax element value (SEV) queue to store the decoded syntax element values;
an overflow indicator;
an empty indicator; and
control logic to control the overflow indicator and the empty indicator based, at least in part, on a number of decode commands that are in the command queue and a number of decoded syntax element values that are in the syntax element value queue;
wherein when the command queue is full and a write command to write the command queue with write data is received, the control logic functions to: configure the command queue to accept the write data but not write the write data to the command queue, and send an acknowledgment that the command queue was written; and
wherein when the syntax element value queue is empty and a read command to read the syntax element value queue is received from a requesting device, the control logic functions to: return dummy data to the requesting device and set the empty indicator.

8. The apparatus of claim 7, where the apparatus functions to receive the decode commands from a processor, where the apparatus functions to prevent the processor from changing the overflow indicator and the empty indicator when the variable length decoder engine is decoding variable length syntax elements of a macro-block (MB) of data.

9. The apparatus of claim 7, where the apparatus is part of a system on a chip, and where firmware running on the apparatus has access to control the overflow indicator and the empty indicator when the variable length decoder engine is not decoding variable length syntax elements of a macro-block (MB) of data.

10. The apparatus of claim 7, further comprising a configuration register, where the overflow indicator and the empty indicator are bits in the configuration register, and where the configuration register is accessible over an advanced high-performance bus (AHB).

11. A method, comprising:
receiving a request to write data to a queue;
determining if the queue is full;
if the queue is not full:
writing the data to the queue; and
sending a reply that the queue has been written with the data;
if the queue is full:
not writing the data to the queue; and
sending a reply that the queue has been written with the data; and
wherein when the queue is empty and a read command to read the queue is received from a requesting device, then returning dummy data to the requesting device and setting an empty bit.

12. The method of claim 11, further comprising:
setting an overflow indicator when the request to write data to the queue is received and the queue is full.

13. The method of claim 11, further comprising:
receiving another request to read another queue from a requesting device;
determining if the another queue is empty; and
returning dummy data to the requesting device when the another request to read the another queue is received and the another queue is empty.

14. The method of claim 13, further comprising:
setting an underflow indicator when the request to read the another queue is received and the another queue is empty.

15. The method of claim 11, further comprising:
decoding a macro-block (MB) of encoded syntax element values of a compressed image, where the decoding is based, at least in part, on data in the queue.

16. The method of claim 11, further comprising:
setting an overflow indicator to a value to indicate the queue overflowed when the request to write data to the queue is received and the queue is full;
controlling the overflow indicator to maintain the value indicating the queue overflowed until a reset message is received from firmware, where setting the overflow indicator and controlling the overflow indicator to maintain the value are performed with hardware; and
resetting the overflow indicator.

17. The method of claim 16, where the queue is controlled to store commands that a variable length decoder (VLD) engine executes to decode encoded syntax elements, and where the reset message is received when the VLD engine is not processing a macro-block (MB) of compressed image data.

* * * * *